United States Patent
Ilijic

(10) Patent No.: US 11,431,523 B2
(45) Date of Patent: Aug. 30, 2022

(54) SYSTEMS, APPARATUSES AND METHODS FOR SYNCHRONIZATION PULSE CONTROL OF CHANNEL BANDWIDTH ON DATA COMMUNICATION BUS

(71) Applicant: Hubbell Incorporated, Shelton, CT (US)

(72) Inventor: Nik Ilijic, Glen Alpine (AU)

(73) Assignee: Hubbell Incorporated, Shelton, CT (US)

( * ) Notice: Subject to any disclaimer, the term of this patent is extended or adjusted under 35 U.S.C. 154(b) by 499 days.

(21) Appl. No.: 15/779,291

(22) PCT Filed: Nov. 28, 2016

(86) PCT No.: PCT/US2016/063858
§ 371 (c)(1),
(2) Date: May 25, 2018

(87) PCT Pub. No.: WO2017/095743
PCT Pub. Date: Jun. 8, 2017

(65) Prior Publication Data
US 2018/0351764 A1    Dec. 6, 2018

Related U.S. Application Data

(60) Provisional application No. 62/261,084, filed on Nov. 30, 2015.

(51) Int. Cl.
*H04L 12/40*  (2006.01)
*G06F 11/28*  (2006.01)
(Continued)

(52) U.S. Cl.
CPC ........ *H04L 12/40013* (2013.01); *G06F 11/28* (2013.01); *G06F 13/20* (2013.01);
(Continued)

(58) Field of Classification Search
CPC .... H04L 12/40013; G06F 11/28; G06F 13/20; G06F 13/4221; H04B 3/50
See application file for complete search history.

(56) References Cited

U.S. PATENT DOCUMENTS

2002/0053970 A1* 5/2002 Plummer ................ H04B 3/54
375/259
2002/0091838 A1* 7/2002 Rupp .................. H04L 12/4013
709/227
(Continued)

FOREIGN PATENT DOCUMENTS

DE    19939568 C1    2/2001

OTHER PUBLICATIONS

International Search Report dated Feb. 3, 2017, which issued in the corresponding Patent Application No. PCT/US2016/063858.
(Continued)

*Primary Examiner* — John D Blanton
(74) *Attorney, Agent, or Firm* — Dickinson Wright PLLC

(57) ABSTRACT

An input/output (I/O) and control system for long distance communications and industrial applications having a bus and protocol for communications between field devices and a channel generator for monitoring and control of the field devices. The channel generator produces an offset square wave of configurable frequency on the bus, and sends a synchronization pulse of selected duration at the start of each bus scan cycle in a pulse train cycle to reset counters in the field devices before the bus scan cycle is repeated, to ensure field devices are synchronized, transmitters transmit on the correct channel, and receivers sample the pulse cycle at the correct time. Changing the synchronization pulse length increases bandwidth for shorter, less noisy and more (Continued)

stable systems and inversely decreases bandwidth for increased noise immunity and distance for longer, noisier and less stable systems.

14 Claims, 12 Drawing Sheets

(51) Int. Cl.
*H04B 3/50* (2006.01)
*H04B 17/00* (2015.01)
*H04Q 1/20* (2006.01)
*H04B 17/15* (2015.01)
*H04L 12/00* (2006.01)
*G06F 13/42* (2006.01)
*H04L 12/46* (2006.01)
*H04L 7/04* (2006.01)
*G06F 13/20* (2006.01)
*H04L 25/49* (2006.01)
*B65G 43/04* (2006.01)
*B65G 43/02* (2006.01)
*B65G 43/06* (2006.01)

(52) U.S. Cl.
CPC ........... *G06F 13/4221* (2013.01); *H04B 3/50* (2013.01); *H04B 17/00* (2013.01); *H04B 17/15* (2015.01); *H04L 7/044* (2013.01); *H04L 12/00* (2013.01); *H04L 12/4625* (2013.01); *H04L 25/4902* (2013.01); *H04Q 1/20* (2013.01); *B65G 43/02* (2013.01); *B65G 43/04* (2013.01); *B65G 43/06* (2013.01)

(56) References Cited

U.S. PATENT DOCUMENTS

| | | |
|---|---|---|
| 2004/0091032 A1 | 5/2004 | Duchi et al. |
| 2007/0233920 A1 | 10/2007 | Misawa et al. |
| 2008/0152062 A1 | 6/2008 | Kocaman et al. |
| 2010/0030345 A1* | 2/2010 | Cole .................. G05B 19/418 700/3 |
| 2013/0106615 A1 | 5/2013 | Prammer |

OTHER PUBLICATIONS

European Search Report dated Jun. 12, 2019, which issued in the corresponding European Patent Application No. 16871317.0.

* cited by examiner

A/B Cycle with Sync Pulse and Control Channels

| Direction | Value | Scan Cycle A | | Scan Cycle B | |
|---|---|---|---|---|---|
| | | Chan-X1 | Chan-X2 | Chan-X1 | Chan-X2 |
| Incoming | ON | Space | Mark | Mark | Space |
| | OFF | Mark | Space | Space | Mark |
| | Fault | Mark | Mark | Mark | Mark |
| | Missing | Space | Space | Space | Space |
| Outgoing | ON | Space | Mark | Mark | Space |
| | OFF | Mark | Space | Space | Mark |

FIG. 6B

FIG. 9A — Pulse Train Timing

| Sync Pulse Time | Band-Width (%) | Pulse Time (μs) | Number of Channels and Time for 1 Cycle (seconds) | | | | | | | | | | | |
|---|---|---|---|---|---|---|---|---|---|---|---|---|---|---|
| | | | 2048 | | 1024 | | 512 | | 256 | | 128 | | 64 | 32 |
| | | | 1 Cycle | | 1 Cycle | | 1 Cycle | | 1 Cycle | | 1 Cycle | | 1 Cycle | 1 Cycle |
| 4 | 50 | 1200 | 5.24 | | 2.62 | | 1.32 | | 0.67 | | 0.34 | | 0.18 | 0.10 |
| 6 | 75 | 1800 | 7.85 | | 3.94 | | 1.98 | | 1.00 | | 0.51 | | 0.27 | 0.14 |
| 8 | 100 | 2400 | 10.47 | | 5.25 | | 2.64 | | 1.33 | | 0.68 | | 0.35 | 0.19 |
| 10 | 125 | 3000 | 13.09 | | 6.56 | | 3.30 | | 1.67 | | 0.85 | | 0.44 | 0.24 |
| 12 | 150 | 3600 | 15.71 | | 7.87 | | 3.96 | | 2.00 | | 1.02 | | 0.53 | 0.29 |
| 14 | 175 | 4200 | 18.33 | | 9.19 | | 4.62 | | 2.33 | | 1.19 | | 0.62 | 0.33 |
| 16 | 200 | 4800 | 20.94 | | 10.50 | | 5.28 | | 2.67 | | 1.36 | | 0.71 | 0.38 |

FIG. 9B — Sync Pulse Length

| Sync Pulse Time (ms) | Band-Width (%) | Channel Time (μs) | Last Channel Type | | | |
|---|---|---|---|---|---|---|
| | | | No Interrupt | | With Interrupt | |
| | | | Mark | Space | Mark | Space |
| 4 | 50 | 1200 | 4.90 | 4.60 | 4.30 | |
| 6 | 75 | 1800 | 7.35 | 6.90 | 6.45 | |
| 8 | 100 | 2400 | 9.80 | 9.20 | 8.60 | |
| 10 | 125 | 3000 | 12.25 | 11.50 | 10.75 | |
| 12 | 150 | 3600 | 14.70 | 13.80 | 12.90 | |
| 14 | 175 | 4200 | 17.15 | 16.10 | 15.05 | |
| 16 | 200 | 4800 | 19.60 | 18.40 | 17.20 | |

| Pulse (ms) | Pulse Time (µs) | Space Window | | Mark Window | |
|---|---|---|---|---|---|
| | | Min | Max | Min | Max |
| 4 | 1200 | 4.10 | 5.10 | 4.40 | 5.40 |
| 6 | 1800 | 6.40 | 7.40 | 6.85 | 7.85 |
| 8 | 2400 | 8.70 | 9.70 | 9.30 | 10.30 |
| 10 | 3000 | 11.00 | 12.00 | 11.75 | 12.75 |
| 12 | 3600 | 13.30 | 14.30 | 14.20 | 15.20 |
| 14 | 4200 | 15.60 | 16.60 | 16.65 | 17.65 |
| 16 | 4800 | 17.90 | 18.90 | 19.10 | 20.10 |

A/B Cycle with Sync Pulse and Control Channels

SYSTEMS, APPARATUSES AND METHODS FOR SYNCHRONIZATION PULSE CONTROL OF CHANNEL BANDWIDTH ON DATA COMMUNICATION BUS

BACKGROUND OF THE INVENTION

Field of the Invention

The present invention relates to systems, methods and apparatuses for automatically reconfiguring devices in communication via a data communication bus to operate using a different channel bandwidth for that bus. In addition, the present invention relates to a method of using synchronization pulse control of channel bandwidth on the data communication bus.

Description of Related Art

Modern conveyors such as those employed in mining and manufacturing operations can exceed 4 kilometers (km) in under round installations and 10 km in overland installations. General conveyor operational parameters are monitored along the entire length of the installation, these include: belt wander, belt tear, belt slip and bearing temperatures, to name a few. These parameters are often difficult to monitor given the distances involved and the lack of power. Further, in the operation of any conveyor installation, there is a need for safety functions such as stopping the conveyor in an emergency situation, and safely remote isolating the conveyor for maintenance purposes, among other operations.

In addition, conveyor installations are, by their nature, hostile environments for any electrical equipment and cabling that may be installed on their superstructure. The equipment and particularly the cabling is subject to vibration, dust, falling material, rain, extremes in temperature and exposure to radiation, all of which can result in the introduction of electrical faults that can compromise the integrity and safety of these monitoring systems and require fast reaction times (e.g., for a controller to accomplish a basic emergency stop and isolation function at a remotely monitored device deployed along the conveyor).

SILBUS is an example of an existing input/output (I/O) and control system having a data communication bus deployed between a controller and field devices along a conveyor or other industrial system having equipment and/ or monitored sensors distributed over or along a geographically large area or long distance for industrial applications and often in harsh environments. SILBUS is commercially available from Austdac Pty Ltd, an affiliate of Hubbell incorporated, with offices in New South Wales and Queensland in the Commonwealth of Australia and in Pittsburgh, Pa. in the United States of America, SILBUS is a family of intrinsically safe (IS) fieldbus products designed for use in hazardous area underground mining or similar industrial applications. SILBUS provides data transmission and power on twisted pair wires for monitoring and control in industrial systems up to 10 km in length, including a control unit or channel generator that is in communication with a range of distributed modules (i.e., input and output devices) that monitor a range of signals such as digital, safety transmitters, voltage, current, temperature, and frequency.

The Austdac SILBUS method of conveyor monitoring and control uses a one cable approach to both monitoring and control of long distance conveyors with long distance transmission over 10 km. SILBUS employs a transmission method which allows for the combined transmission of safety-rated (e.g., SIL3 according to the International Standard IEC 61508 or its Australian edition, AS 61508) conveyor emergency stop signals with monitoring and control signals for field devices such as belt alignment switches, tilt switches, belt rip switches, as well as analog values relating to bearing temperature and vibration.

In SILBUS, all safety and standard digital inputs are down line powered, eliminating the need for external power along the length of conveyor. For example, one field device that is commonly deployed along a conveyor is a pull key, which is used to provide controlled stop functions for distributed plant conveyors. The Austdac pull key or cable-pull limit switch type ESS3 has many applications in controlling a distributed plant such as conveyors or belts used in mining or materials handling industries. The pull key can be operated using a front, centrally-located knob or each of two side-located, flexible cable-pull actuators. The side cable-pull actuators can be used in tensioned and non-tensioned systems. The control and monitoring transmitters in a pull key arc system powered, such that no external power source needs to be connected along the length of the conveyor.

SILBUS, however, has limitations in terms of noise immunity from variable frequency drives, and limitations with respect to the number of channels for input and output devices, as well as limitations on transmission distances on large overland conveyors, and line powering of the distributed devices. For example, many large motors are used to power conveyors; these motors are switched on and off, change speed from low to high and trip off on overload. Variable speed motor drives are also employed. Because these activities all take place at the end of relatively long supply cables, the electrical environment is characterized by the presence of large switching transients, general electrical noise and harmonics.

A need therefore exists for a data communications bus in a system that accommodates more devices which can be deployed over greater distances and has improved noise immunity. Further, it can be difficult to configure a large number of geographically distributed devices. A need exists for devices in the field to automatically reconfigure themselves when the control unit or channel generator with which they communicate changes a system parameter such as the number of channels of communication and the bandwidth used per channel.

SUMMARY OF THE INVENTION

The above and other problems are overcome, and additional advantages are realized, by illustrative embodiments of the present invention.

In accordance with illustrative embodiments of the present invention, methods and systems are provided to implement a bus protocol for interfacing a control unit to plural devices connected to the bus comprising generating a pulse train comprising a plurality of cycles for transmission on the bus, each of the cycles comprising a low voltage level portion for a designated period of time and a high voltage level portion for a designated period of time, and at least some of the cycles assigned to respective ones of the plural devices as I/O channels, wherein the pulse train comprises bus scan cycles that each comprise a selected number of the I/O channels, and a synchronization pulse after the I/O channels that is configured to vary in duration in accordance with a designated change in channel bandwidth. An channel can comprise, for example, one of the cycles, or a designated plural number of the cycles.

In accordance with aspects of illustrative embodiments of the present invention, the pulse train is a periodic waveform comprising instantaneous transition between the high voltage level and the low voltage level.

In accordance with aspects of illustrative embodiments of the present invention, the pulse train has configurable frequency. For example, the pulse train is an offset square wave with configurable frequency. In accordance with another example, the configurable frequency is dynamically configurable by the control unit during operation of the bus.

In accordance with aspects of illustrative embodiments of the present invention, the bus scan cycles comprise dual scan bus cycles having alternating A and B scan cycles where each A scan cycle and each B scan cycle comprises the selected number of I/O channels and the synchronization pulse.

In accordance with aspects of illustrative embodiments of the present invention, the pulse train is an offset square wave with configurable frequency, and comprises a selected number of cycles that are assigned to a corresponding number of the I/O channels and that are generated by the control unit. For example, the selected number of I/O channels is configured in the control unit.

In accordance with aspects of illustrative embodiments of the present invention, the pulse train is an offset square wave and the high voltage level is between 12 VDC and 48 VDC and the low voltage level is between 2 VDC and 9 VDC.

In accordance with aspects of illustrative embodiments of the present invention, each of the plural devices is assigned to a corresponding one of the I/O channels in each of the bus scan cycles and has a counter, and the plural devices each reset their counter in response to the synchronization pulse to ensure that the plural devices transmit and receive on their corresponding channels and that the control unit samples the pulse train at a correct pulse or pulses (e.g., depending on the number of cycles used to represent an I/O channel) corresponding to a selected one of the plural devices.

In accordance with aspects of illustrative embodiments of the present invention, the synchronization pulse is generated at the high voltage level for different respective durations of time corresponding to different channel bandwidths.

In accordance with aspects of illustrative embodiments of the present invention, the high voltage level portions in the cycles of I/O channels in the bus scan cycles can vary in at least one of duration within a cycle, and start of a rising edge of the high voltage level portion within a cycle, depending on whether the cycles are pulse width modulated as a mark or a space, the synchronization pulse is at the high voltage level for a selected duration of time depending on the channel bandwidth, and detection of the synchronization pulse employs a detection window having a range between the duration of the synchronization pulse and a mark and the duration of synchronization pulse and a space for detection of the synchronization pulse regardless of whether the last one of the I/O channels has a mark or a space.

Illustrative embodiments and respective aspects thereof can be used with other illustrative embodiments.

Additional and/or other aspects and advantages of the present invention will be set forth in the description that follows, or will be apparent from the description, or may be learned by practice of the invention. The present invention can comprise an I/O and control system and data communication bus protocol and methods for forming and operating same having one or more of the above aspects, and/or one or more of the features and combinations thereof. The present invention can comprise one or more of the features and/or combinations of the above aspects as recited, for example, in the attached claims.

BRIEF DESCRIPTION OF THE DRAWINGS

The present invention will be more readily understood with reference to the illustrative embodiments thereof as shown in the attached drawing figures, in which:

FIG. 6B is a table providing scan cycle states and corresponding values for the pulse train of FIG. 9A.

FIGS. 9A and 9B are tables indicating, respectively, example pulse train cycle times and mark/space timings depending on synchronization (sync) pulse duration and corresponding bandwidth in accordance with an embodiment of the present invention.

Throughout the drawing figures, like reference numbers will be understood to refer to like elements, features and structures.

DETAILED DESCRIPTION OF ILLUSTRATIVE EMBODIMENTS

Figure 1:
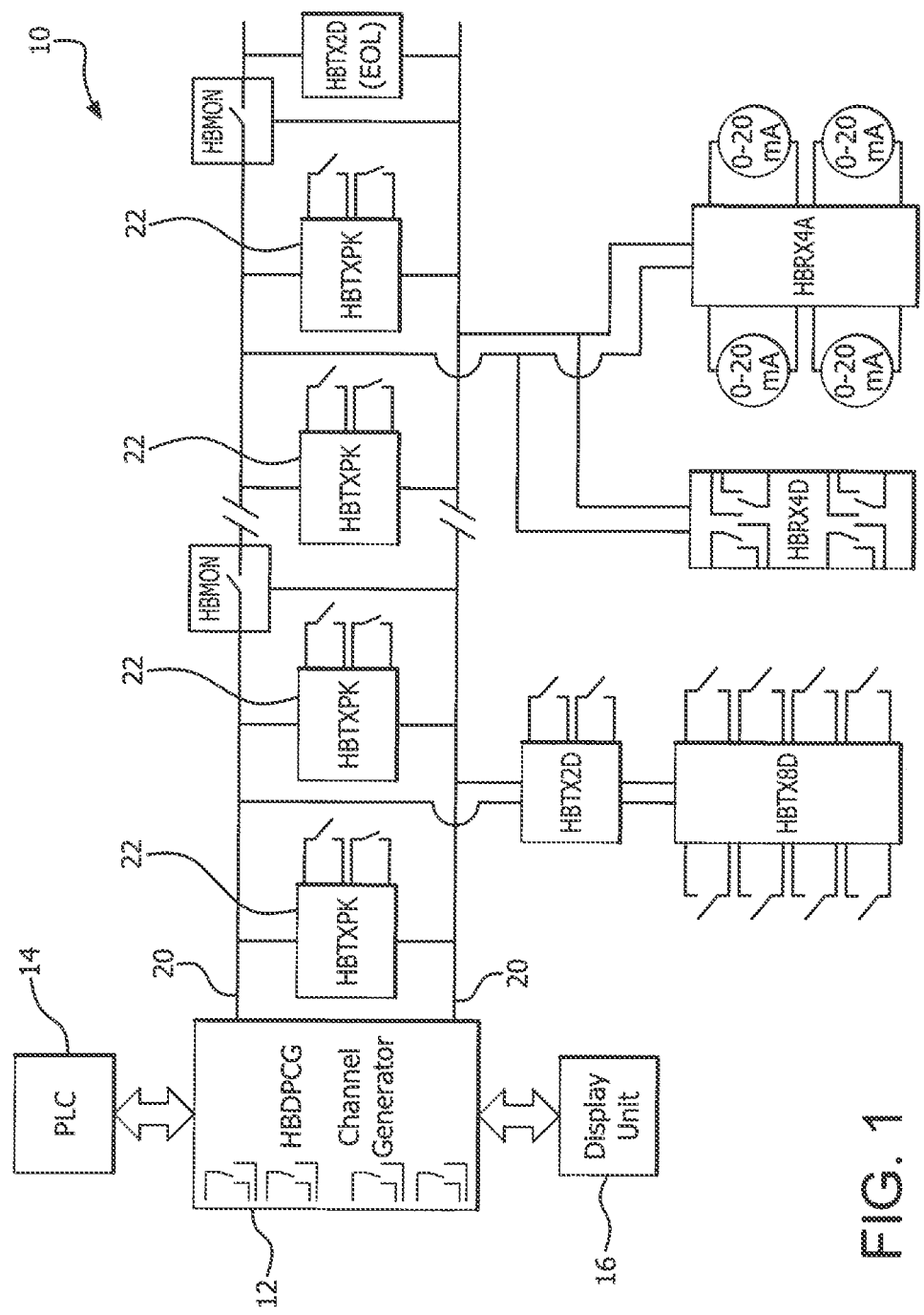
FIG. 1 is a block diagram of an input/output (I/O) and control system employing a data communication bus protocol in accordance with an embodiment of the present invention.

Reference will now be made in detail to embodiments of the present invention, which are illustrated in the accompanying drawings. The embodiments described herein exemplify, but do not limit, the present invention by referring to the drawings. As will be understood by one skilled in the art, terms such as up, down, bottom, and top are relative, and are employed to aid illustration, but are not limiting.

The following definitions are provided for reference in connection with the following description of various aspects of illustrative embodiments of the present invention:

ADC: analog to digital converter, channel pulse or window: a cycle comprising low voltage level portion for a designated period of time, and a high voltage level portion for a designated period of time, channel bandwidth: total time allocated to each channel pulse (e.g., default value of 2400 us), channel generator or control unit: a controller module that generates an outbound waveform and receives inbound transmissions, common line: a low voltage (e.g., 0 V) return line, high floor (or high side) value or threshold: an upper current level required for valid inbound signal transmission, inbound: transmission from a line device to the channel generator, low floor (or low side) value or threshold: lower current level required for inbound signal transmission, mark: inbound or outbound transmission within a channel's window, outbound: transmission from the channel generator to line device, pulse pair: two pulses which represent the state of a channel, receiver: a line device that listens for outbound messages, signal line: a high side or voltage line with waveform generated by the channel generator, space: inbound or outbound non-transmission within a channel's window, transmitter: a line device that transmits inbound messages.

With reference to FIG. 1, an I/O and control system 10 is provided in accordance with an illustrative embodiment of the present invention. As described below, the I/O and control system 10 is advantageous because it supports variable channel bandwidth, among other reasons. A channel generator maintains an offset square wave, for example, of a configurable frequency, with a pair of pulses representing one channel (e.g., an I/O channel). The number of pulses and therefore the number of channels can be configured in the channel generator. For example, a typical number of channels is 64, 128, 256 or 512, with 1024 or 2048 channels being available for large systems. Thus, a system designer can increase bandwidth for shorter, less noisy and more stable I/O and control systems, and inversely decrease bandwidth for increased noise immunity and distance for longer, noisier and less stable systems by utilizing a synch pulse and changing the synch pulse length as described below.

The I/O and control system 10 comprises Programmable Logic Controller (PLC) 14 and a display unit 16, which are shown connected to a control unit or channel generator 12. The PLC 14 and display unit 16 can be connected to the channel generator 12 via Ethernet or RS485 MODBUS, for example. The control unit or channel generator 12 is connected to a plurality of I/O modules via a bus indicated generally at 20. The I/O modules indicated generally at 22 can include, but are not limited to, one or more pull-key transmitters (HBTXPK), network monitor (HBMON), and other types of transmitters such as a two channel digital transmitter (HBTX2D), an eight channel digital transmitter (HBTX8D), a four channel digital receiver (HBRX4D), and four channel analog receiver (HBRX4A). As shown, one of the modules is operated as an end of line (EOL) monitor.

The illustrative I/O and control system 10 can be used for a target industry such as the overland conveyor industry and its associated activities such as stacker reclaimers and port coal loading facilities. The illustrative I/O and control system 10 can be used for other industrial and commercial applications such as car parks (e.g., having parking space sensors for parking space availability tracking), lighting automation, and other systems which employ monitoring by and control of many distributed input and/or output (I/O) devices or modules. The I/O modules are distributed or positioned at locations along a conveyor, for example, or other line or pattern (e.g., parking lot grid lines) depending on the system 10's industrial or commercial application. The I/O modules are connected to each other and the controller or channel generator 12 by the bus 20.

The bus 20 can be, for example, any cable that allows communication and provides power over long distances. The bus can be a two wire system. For example, the bus can employ twisted pair for improved noise and crosstalk immunity as the cable is key area for noise immunity. Additional specifications for a cable deployed fear the bus 20 can be, for example, 2.5 mm$^2$ cores, low capacitance, configured for reduced reflection and propagation delays, and no shield for ease of installation in normal circumstances but provided for worst case scenario.

The I/O and control system 10 can supply sufficient power to supply line powered I/O modules or devices at a minimum 12 VDC from the controller 12, or a supply of 48 VDC to allow for a required number of line powered devices depending on the particular application for which the system 10 is being used. For example, the supply of a larger voltage level (e.g., 48 VDC) at the controller 12 can allow for better power distribution on long cable runs where there may be significant voltage drops on the line. Channel bandwidth can be selected and altered to supply sufficient power to I/O modules or devices connected via the bus and deployed along a conveyor or other line or pattern depending on the system 10's industrial or commercial application.

Due to the longer conveyor or commercial or industrial line lengths needed, a larger number of I/O modules or devices are also needed. The illustrative I/O and control system 10 can be configured, for example, to meet a minimum transmission distance of 16 km. Further, the I/O and control system 10 can be configured in accordance with illustrative embodiments of the present invention to operate a minimum of 512 I/O channels and to power a minimum of 320 transmitters from the bus 20, for example, which represents significant improvements and advantages over SILBUS and other existing I/O and control systems. In addition, and in accordance with an illustrative embodiment of the present invention, the I/O and control system 10 is scalable, that is, it can be configured to increase the number of channels with a decrease in refresh rates and vice-versa via the controller 12. Further, in accordance with another aspect of the illustrative embodiment of the present invention, all of the I/O modules are automatically self-configuring for channel bandwidth and number of channels.

Figure 2:
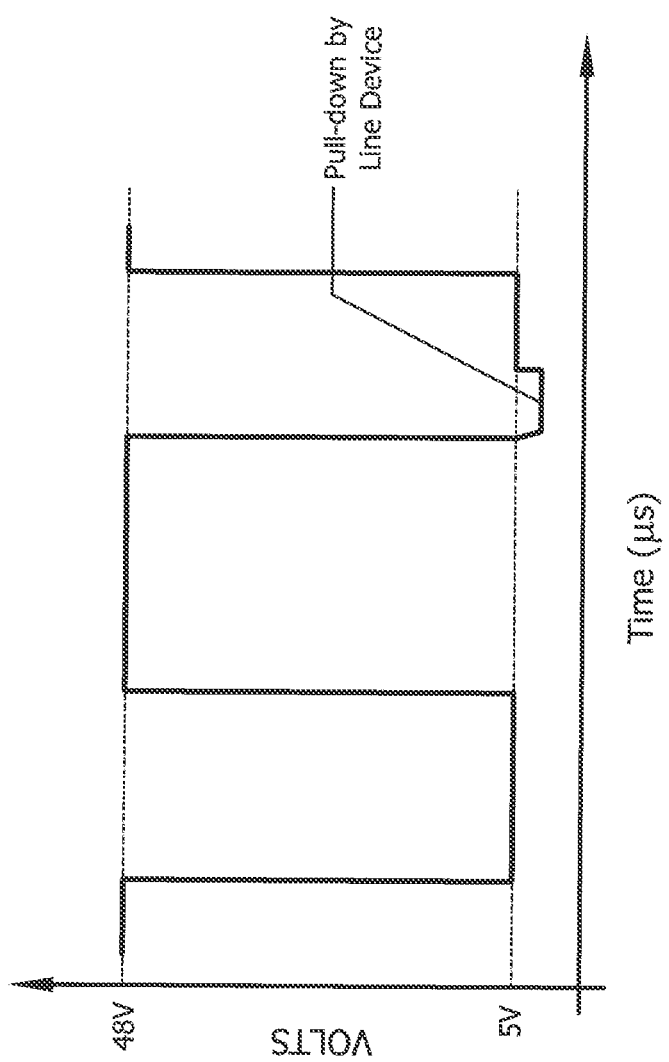
FIG. 2 is a diagram illustrating bus signal voltage levels of an example physical layer of the I/O and control system in accordance with an embodiment of the present invention.

The physical layer of the I/O and control system 10 will now be described with reference to FIG. 2 and in accordance with an illustrative embodiment of the present invention. To maximize the distance covered by the system 10, the high voltage level is 48 VDC for example. The voltage level at the low level shall be 5 VDC, for example. Additionally, for example, no line devices (e.g., I/O modules) draw off the line at 9 VDC or lower. When producing the low level supply voltage, the controller 12 passes the voltage through a current sensing circuit. Any devices that need to drive data in its assigned channel during the low voltage period can pull-down on the signal line to the common line on the bus 20. Since there is no load on the low voltage level (5 VDC), its output should remain near that level for the length of the line. The high level voltage side allows for large voltage drops in the bus signal and devices on the bus should remain operational down to 12 VDC. The use of inbound current sensing devices in the channel generator 12 provides significantly increased levels of EMC protection over the voltage load and edge sensing techniques used in SILBUS. A minimum of 2A at 48 VDC is generally available from the channel generator or controller 12.

Figure 3:
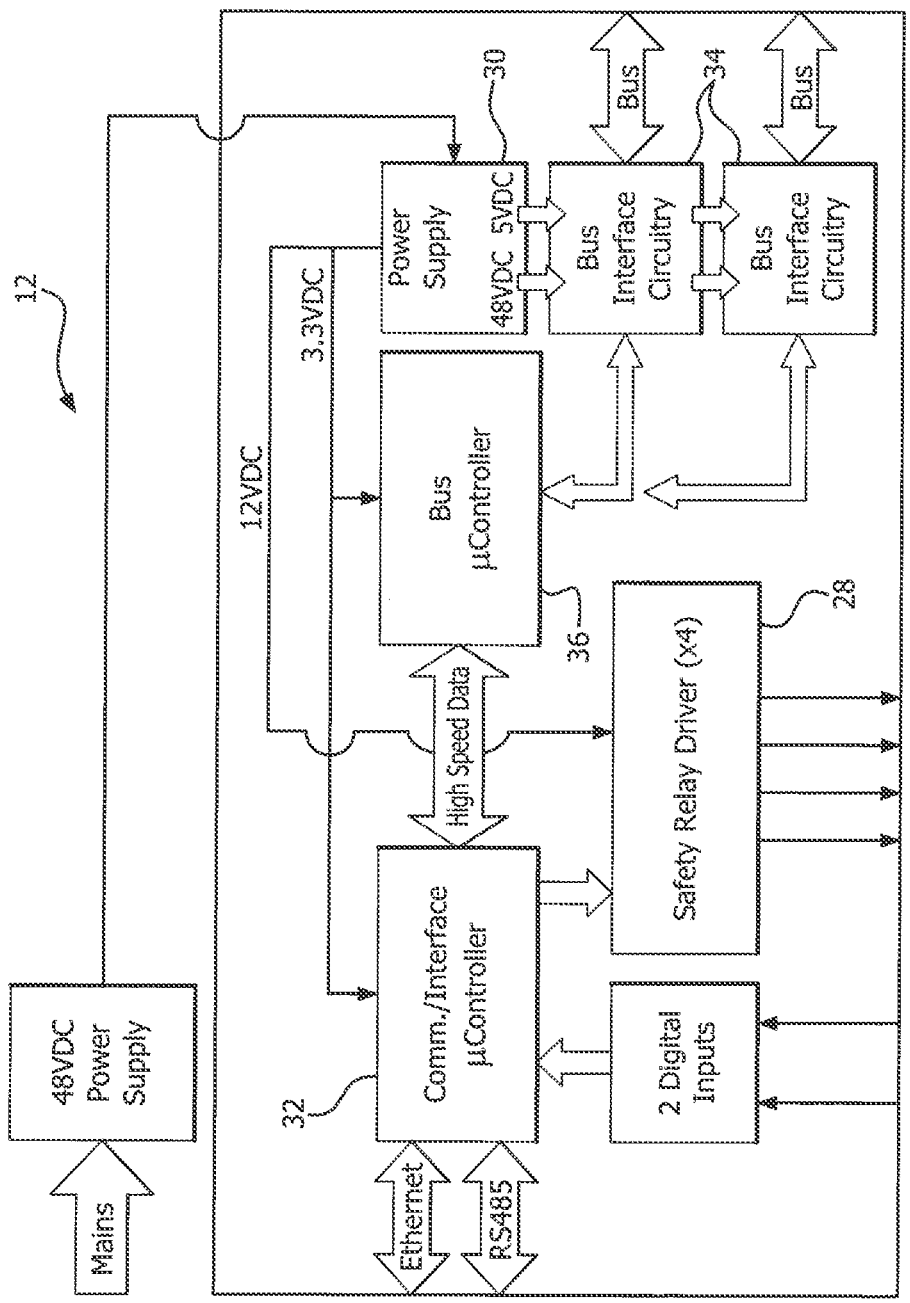
FIG. 3 is a block diagram of a control unit employed in the I/O and control system in accordance with an embodiment of the present invention.
Figure 4:
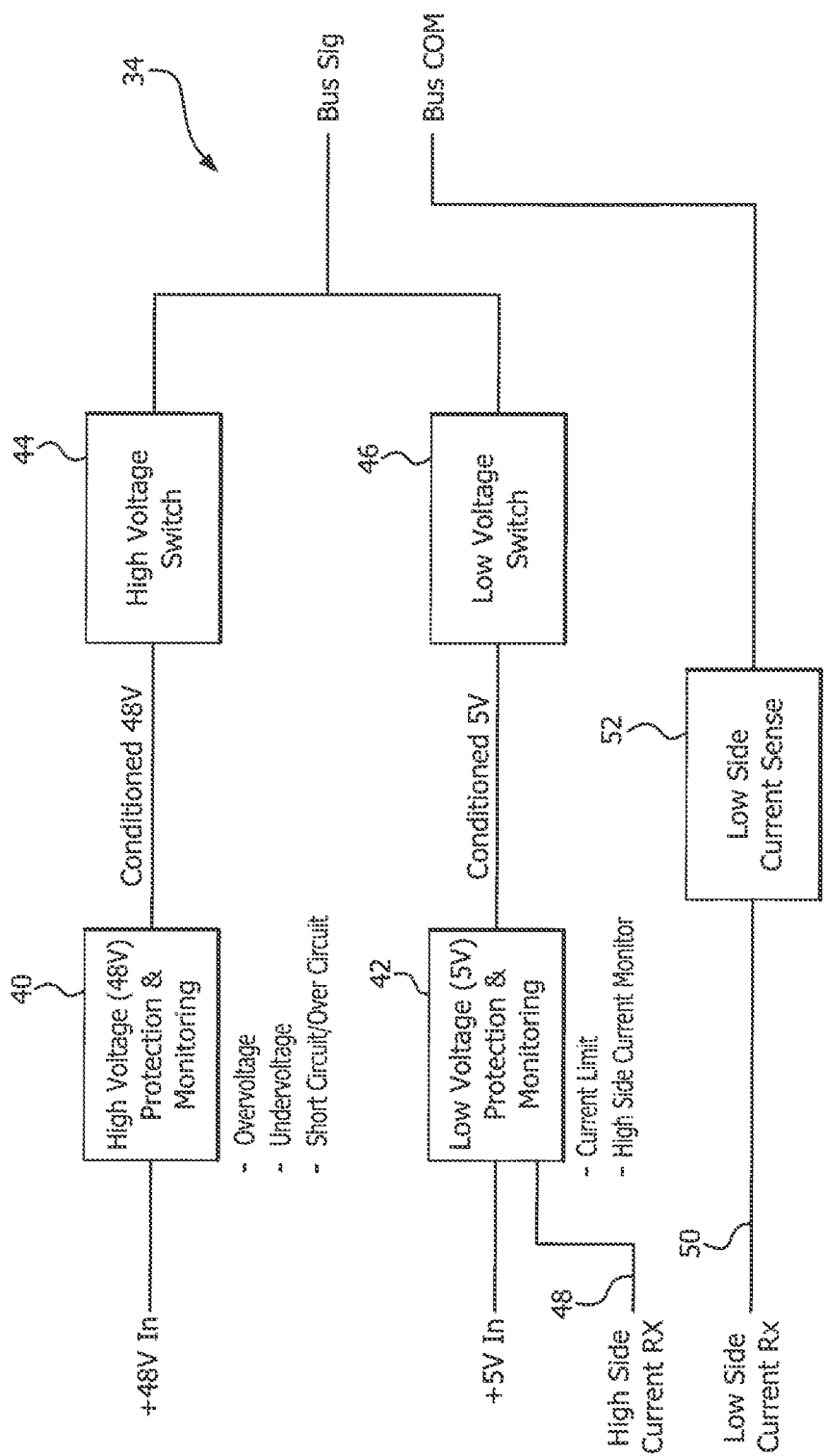
FIG. 4 is a Hock diagram of bus interface circuitry employed in the control unit of FIG. 3 and constructed in accordance with an embodiment of the present invention.

With reference to FIGS. 3 and 4, an example of a dual port controller or channel generator 12 is provided which generates the bus signal, senses incoming transmissions from line devices 22 on the bus 20, and interfaces to the outside world (e.g., via an Ethernet or Rs485 interface). A 48 VDC power source is connected to a power supply 30 in the channel generator 12 that, in turn, provides operating voltages such as 12 VDC for a relay driver 28 and 3.3 VDC for other electronic components such as a microcontroller 36, one or more bus interface circuits 34, and a communications interface 32. The channel generator 12 has channel logic decoding which in turn may be used to drive relays for controlling or signaling external devices. The channel generator 12 can have LEDs (not shown) for indicating health of the controller, power source and/or bus 20, Ethernet activity, and local digital input.

FIG. 4 is a block diagram of a channel generator bus interface 34 in accordance with an illustrative embodiment of the present invention. High (48V) and low (5V) voltage protection and monitoring modules 40 and 42 provide conditioned high and low voltage signals to respective high and low voltage switches 44 and 46 to drive the outbound bus signal in accordance with a protocol as described in more detail below. High side and low side current signals 48 and 50 carry incoming or inbound transmissions from line devices on the bus 20 that are detected via the current sense circuits 42 and 52.

Figure 5A:
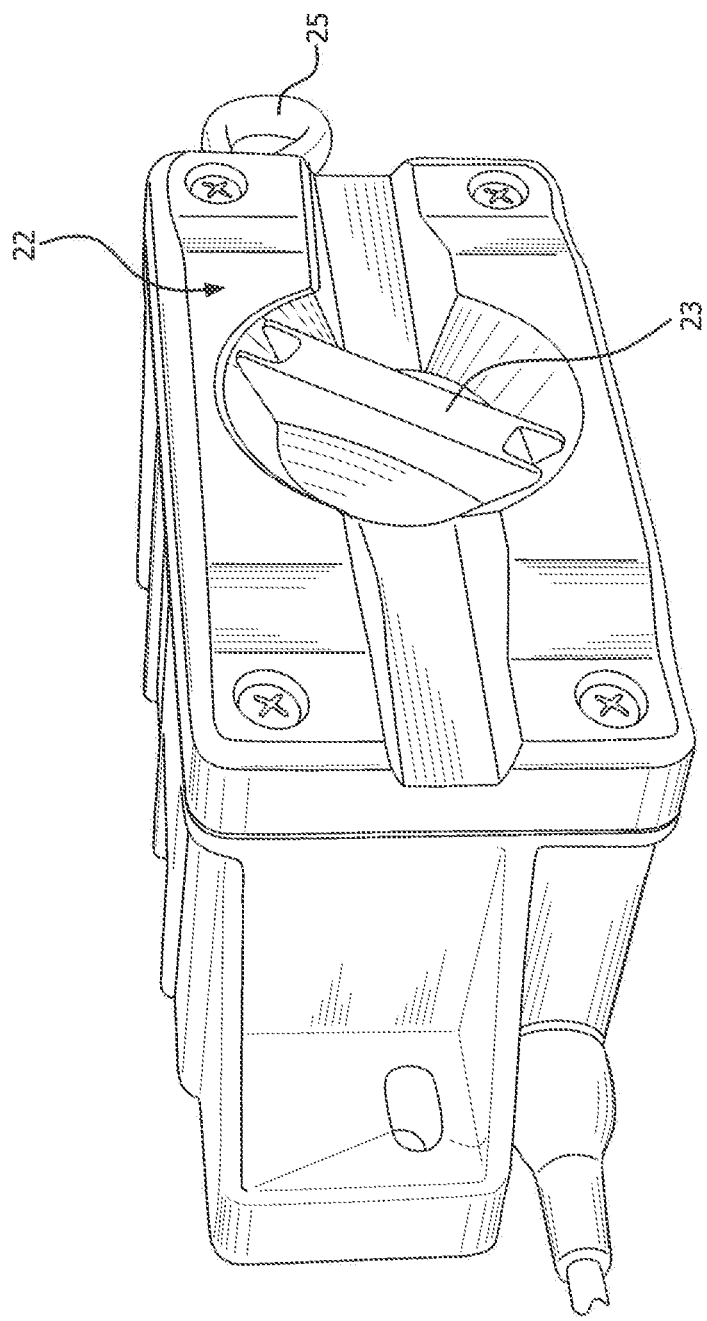
FIGS. 5A and 5B illustrate, respectively a perspective exterior view and a block diagram of an example field device in the I/O and control system in accordance with an embodiment of the present invention such as a pull key housing in which a transmitter is deployed.
Figure 5B:
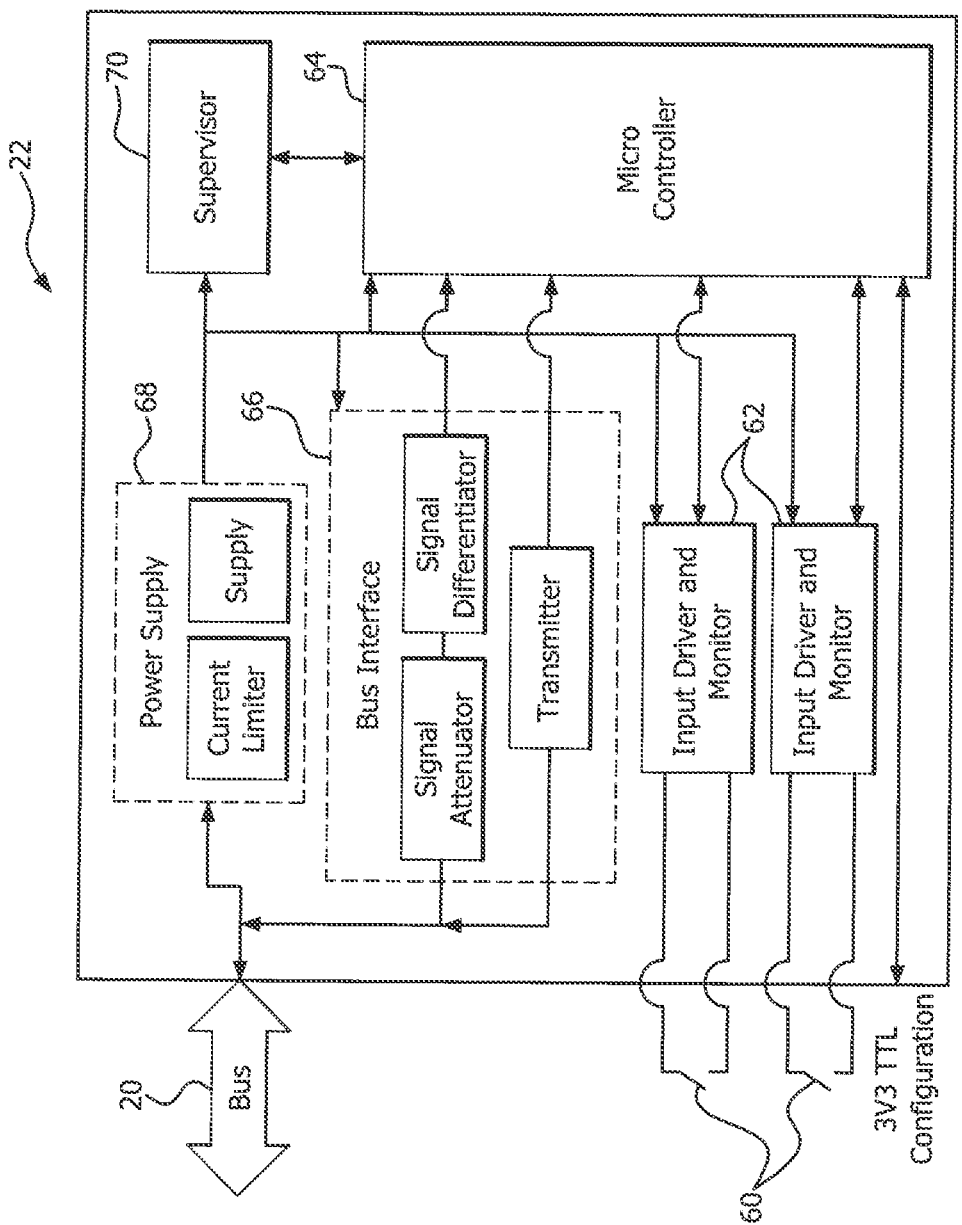

FIGS. 5A and 5B depict, respectively, a pull-key transmitter (HBTXPK) 22 as an example I/O module or line device 22 constructed in accordance with an illustrative embodiment of the present invention. With reference to FIG. 5A, the two-input transmitter 22 is fitted into a pull-key (or cable-pull limit switch) assembly. The pull key is used to provide controlled stop functions for distributed plant or conveyors. The pull key can be operated using the front centrally located knob 23 or each of the two side located flexible cable-pull actuators 25. The side cable-pull actuators 25 can be used in tensioned and non-tensioned systems.

With reference to FIG. 5B, the transmitter 22 has two inputs 62 driven by voltage free contacts 60. One contact 60 is Normally Open (NO) and the other contact 60 is Normally Closed (NC). It is expected that the change-over of contacts occurs at the same time and only a single output channel is required, if both inputs are in the same state, a fault condition is considered to exist. The microcontroller 64 and bus interface 66 process the inputs 62 for transmission on the bus 20. A power supply 68 receives power (e.g., a low voltage signal) from the bus to provide power to the components of the transmitter 22. A supervisory circuit 70 can be provided to monitory health of the transmitter such as power level.

By way of another I/O module or line device 22 example, a two digital input transmitter (HBTX2D) is like the pull-key transmitter (HBTXPK). Transmitter has two inputs 62 driven by voltage free contacts 60. Rather than a single output with dual input with redundancy, the dual input transmitter outputs two separate states on different channels. An eight digital input transmitter (HBTX8D) has inputs driven by voltage free contacts. States output on 8 separate I/O channels on the bus 20. The eight-channel digital transmitter is a small line powered transmitter capable of transmitting the status of eight voltage free contacts and can be used for sensing the status of remote voltage free contacts such as emergency stop, pull key, belt wander, belt rip and blocked chute switches on long conveyors to name but a few. The transmitter can be title powered from the two-wire bus 20 network cable, thereby reducing installation and cabling costs.

Additional examples of I/O modules 22 include, but are not limited to, a four channel analog transmitter (HBTX4A) with 0-2 VDC or 0-20 mA input. Any offsets such as 0.4V or 4 mA will not be removed but rather transmitted. Data (e.g., 12 bits+4 CRC bits) is transferred via the datalink protocol over the configured number of channels. A four channel analog receiver (HBRX4A) has 0-2 VDC or 0-20 mA output. Data (e.g., 12 bits+4 CRC bits) is transferred via the datalink protocol over the configured number of channels.

Another example I/O module 22 is a four channel receiver (HBRX4D) with digital (relay) outputs. The HBRX4D can receive from just a few through to many digital ON/OFF signals from the control system 10 bus network to control the four relay outputs directly or via complex multi-term logic functions. The digital receiver has four output relays controlled by up to six logic resolvers (4 physical linked to a relay and 2 virtual may be used to drive a channel) capable of implementing OR, AND, NOR, NAND and FLIP logic functions. Each resolver has an independently configurable output ON and OFF delay filter to allow implementation of simple timer functions. Further, a dual channel temperature transmitter (HBTX2T) has a temperature input designed to work with a standard two, three or four wire PT100 temperature sensor. The temperature transmitter can be configured to operate on one of two temperature ranges, −10° C. to +100° C. or −20° C. to +200° C., which makes the module particularly suited to monitoring bearing or similar plant temperatures via the bus 20 network without any requirements for additional power. A network monitor reports back to the channel generator and control unit 12 various network and line parameters such as, but not limited to, line voltage, slew rate, reflection, and ground leakage. The monitor (HBMON) may also be used to isolate downstream parts of the network to help with fault isolation.

The applications of the I/O modules 22 (e.g., transmitters and receivers) are not limited to conveyor installations, hut can be used in any application where the status of a remote switch contact or relay contact is required to be monitored, for example.

The data layer of the I/O and control system 10 will now be described in accordance with an illustrative embodiment of the present invention. The basis of data transmission along the bus 20 is pulse width modulation (PWM) for outbound communications (e.g., from control unit 12 to line devices 22 such as the pull key transmitter (HBTXPK)) and current detection for inbound communications (e.g., from line devices or I/O modules 22 to the control unit or channel generator 12). The channel generator 12 continuously maintains an offset square wave of a configurable frequency, wherein each of plural channel windows or pulses comprises a low voltage portion and a high voltage portion. A channel window or pulse can be used to represent one I/O channel described below. Alternatively, a designated plural number (e.g., 2 or more) of channel windows or pulses can be used to represent one I/O channel. The number of channel pulses and therefore the corresponding number of channels (e.g., I/O channels described below) can be configured in the channel generator. The typical number of channels is 64, 128, 256 or 512 (with 1024 and 2048 available for large systems).

The I/O and control system 10 is a distributed I/O system such that not all communications are from the field devices 22 to the control unit 12 or vice versa. For example, communications can be from field device 22 to field device 22. The I/O and control system 10 couples the inbound to the outbound communications, allowing multiple receivers (e.g., among the field devices 22 and control unit 12) to sample or eavesdrop on a single transmitter device, thus providing true distributed I/O. Coupling is achieved upon the channel generator 12 sampling the inbound current detection and immediately altering the outbound pulse width modulation to reflect the state of the inbound channel. In some applications, the inbound and outbound communication can be un-coupled and is referred to split I/O.

Figure 6A:
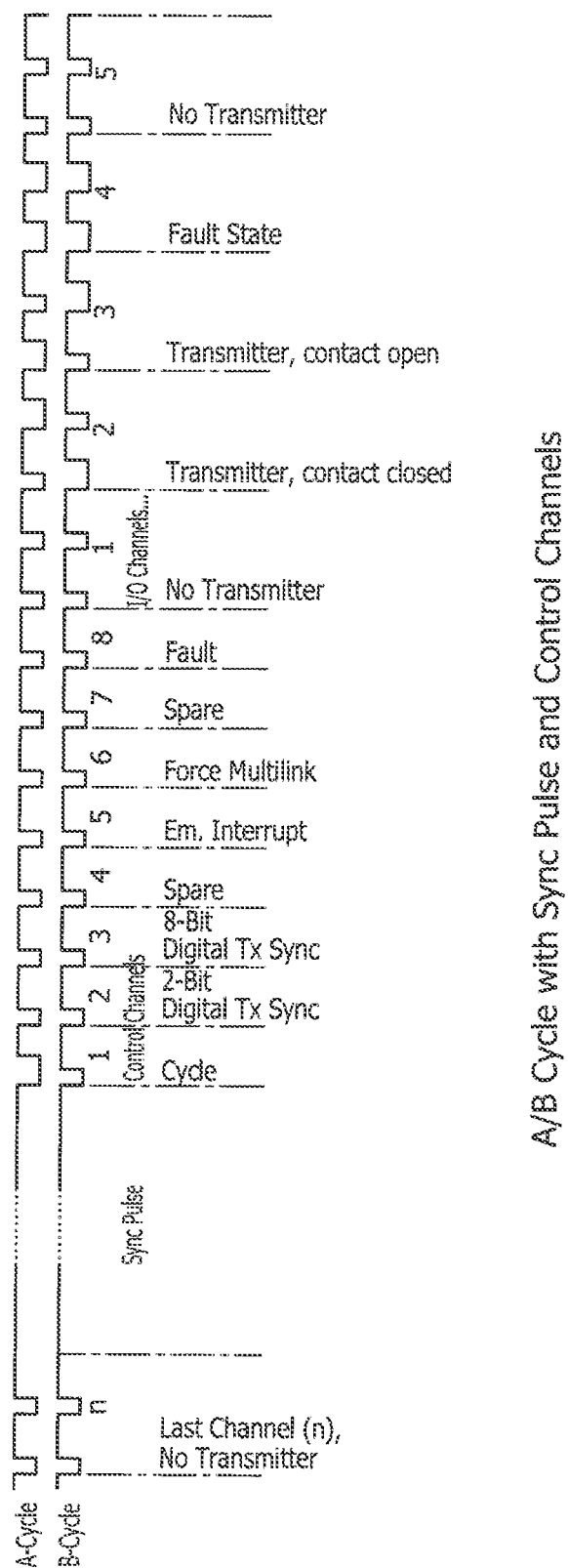
FIG. 6A is a diagram of a pulse train employed in a data communication bus protocol in accordance with an embodiment of the present invention.

Example inbound and outbound channels in a pulse train on the bus 20 will now be described with reference to FIGS. 6A, 6B, 7A, 7B, 8A and 8B. FIG. 6A depicts a complete scan of the bus 20 which consists of, for example, two complete cycles of a pulse train (hereinafter referred to as cycle A and cycle B). A pulse train can comprise, for example:

A synchronization pulse (hereinafter sync pulse);
Eight (8) control channels; and
64×n I/O channels were n=1.32 (i.e. 64 to 2048 I/O channels). As will be described below in connection with FIGS. 6A and 6B, each I/O channel toggles its inbound and outbound state on alternating cycles, allowing for unit detection (and removal detection) and providing improved noise immunity of false triggers.

By way of an example, the control channels can comprise 8 system control bits (e.g., Bits 1 through 8) wherein Bit 1 is a cycle sync indicator that is set to indicate whether the current pulse train is an A scan cycle or a B scan cycle. One or more designated system control bits can be unassigned to allow for future system configuration or control settings. For example, Bits 4 and 7 can be spare bits that can be assigned a system control function at a later date. The Outgoing bits for Bits 4 and 7 are set as spaces for all cycles. The inbound bits for Bits 4 and 7 are not set by any line module 22. A Bit 5 can be designated as an emergency interrupt mode enabled indicator. In other words, if this bit is set by the channel generator 12, then a special priority interrupt mode is enabled for transmitters to indicate an emergency situation. If the priority interrupt feature is enabled, then Bit 5 is set in both of the A and B scan cycles. Bit 6 is a force multilink mode indicator for system diagnostic purposes, for example. Information can be requested from specific registers in this mode such as, for example, device 22 type, serial number, device status, and so on. If Bit 6 is set, then any safety functions automatically go to the safe state. Bit 6 can be used to force channels 1 to 16 to a multi/ink mode for all devices 22 programmed on these addresses such that these devices 22 will not transmit unless specifically addressed in a multilink protocol, as will any other device 22 addressed by the multilink protocol. Bits 2 and 3 can be a digital transmission sync bits that mark the beginning of, for example, a 12 bit data+4 bit CRC digital transmission where Bit 2 indicates a 2 bit per cycle transmission, Bit 3 indicates an 8 bits per cycle transmission and the combination of both Bits 2 and 3 indicate the transmission of 16 bits per cycle and are thus set as a mark state on the $8^{th}$, $2^{nd}$ or every pulse train cycle respectively. Bit 8 can be a fault bit such that, in the event of a system fault being detected by the channel generator 12, the outgoing fault bit is set as a mark to indicate the fault condition to the rest of the system 10. Likewise, if a major system fault is detected by one of the modules 22 (e.g., such as a failure of a safety function), the incoming fault bit is set as a mark and the channel generator 12 in turn sets the outgoing bit. Each individual I/O module can also indicate a failed state by driving both cycles of the scan with a mark on the incoming channel. It is understood that different types of, and more or less number of, control channels or control bits can be used in a pulse train scan cycle A or B.

Figure 7A:
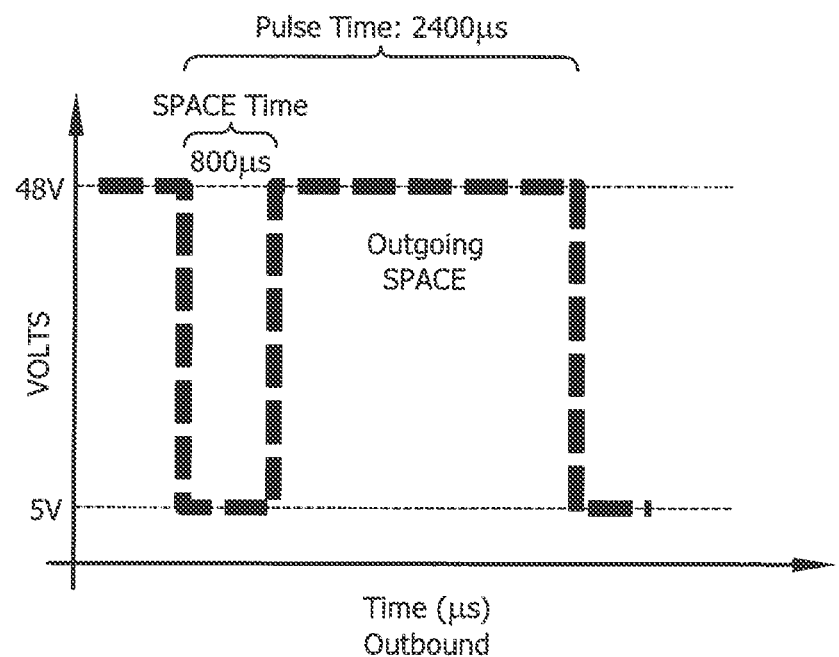
FIGS. 7A and 7B are signal diagrams illustrating outbound channel pulse timing of a data communication bus protocol in accordance with an embodiment of the present invention.
Figure 7B:
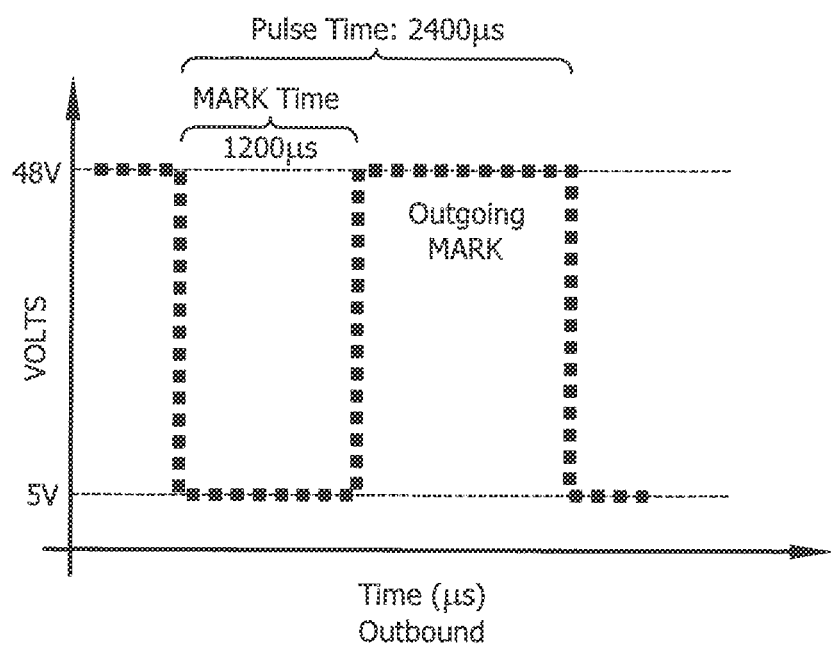

FIGS. 7A and 7B depict illustrative outbound pulse timing. For example, at the start of a channel, the signal drops from the high voltage level to the low voltage level. A 'space' is 800 µs (e.g., or ⅓ of the channel bandwidth) of low voltage level before returning to the high voltage level for the remaining time of the channel's bandwidth of 1600 µs. A 'mark' is 1200 µs (e.g., or ½ of the channel bandwidth) of low voltage level before returning to the high voltage level for the remaining time of the channel's bandwidth of 1200 µs (e.g., or ½ of the channel bandwidth).

Figure 8A:
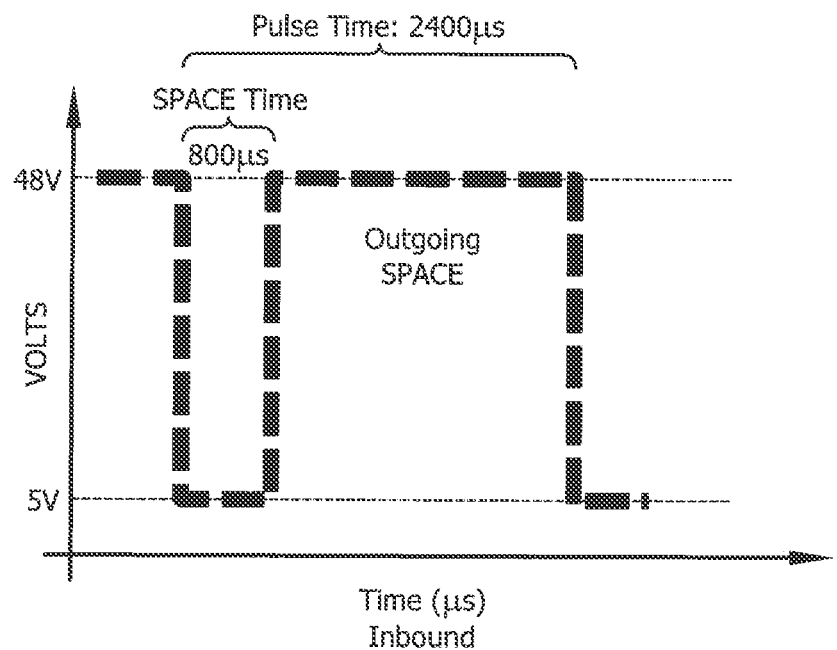
FIGS. 8A and 8B are signal diagrams illustrating inbound channel pulse timing of a data communication bus protocol in accordance with an embodiment of the present invention.
Figure 8B:
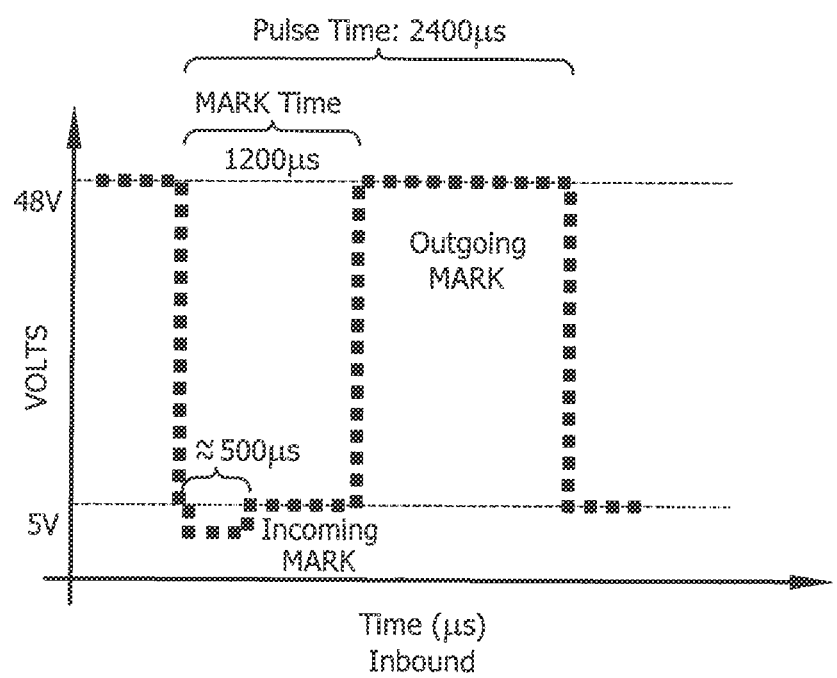

FIGS. 8A and 8B depict illustrative inbound pulse timing. A transmitter (e.g., in a device 22) which has detected its channel in a pulse train cycle can either pull-down on the bus 20 or it can be passive. The pull down is made during the first 500 µs and is detected by the channel generator 12 via current measurement. For normal I/O channels, once a valid pull down has been detected, the channel generator 12 will delay the rising edge of the pulse by an additional 400 µs. It is this additional delay to the rising edge of the pulse that other appropriately coded receivers (e.g., in devices 22) detect and act upon. Because the pulse train and modulation is present along the entire length of the bus 20, receivers may be placed at any convenient point along the bus to monitor a channel for local output. In fact, many receivers may monitor the same channel or transmitter.

With reference to FIG. 6A and the table in FIG. 6B, each channel toggles its inbound and outbound pulse-pair state on alternating cycles, allowing for unit detection (and removal detection), detection of stuck transmitters and providing improved noise immunity of false triggers. For example, each pulse train's I/O channels pulse-pair carry 1 bit of inbound and outbound data. If an inbound pulse is set, then the channel generator 12 sets the outbound state for that pulse. The channel generator may also set the outbound state independent of the inbound state. In normal operation, the channel states in the A-pulse train or A-cycle and in the B-pulse train or Bicycle are inverted states. In other words, if the inbound and outbound state of channel 2 is "ON" in the A-pulse train with a space-mark pulse pair, then it has a mark-space pulse-pair in the B-pulse train. Likewise, if the inbound and outbound state of channel 3 is "OFF" in the A-pulse train with a mark-space pulse pair then it has a space-mark pulse-pair in the B-pulse train. The exceptions to this are (1) a transmitter missing or having failed and then the channel pulse-pair in both pulse trains is space; (2) a transmitter indicating fault condition and then the channel pulse-pair in both pulse trains is a mark; and (3) channels carrying data which transmit 2-bits of data (of a 12 bit value plus 4 bit CRC) consecutively each pulse train cycle.

With continued reference to FIG. 6A, a complete scan of the bus 20 consists of two complete cycles of the pulse train (e.g., cycle A and cycle B). For illustrative purposes in FIG. 6A, channel 3 is shown transmitting an 'OFF' state, channel 2 is shown transmitting an 'ON' state, channel 4 is transmitting a fault state and there are no other devices present on other channels. Pulse train A has:

a sync pulse;
8 control channels (1st control channel is a 'mark' to indicate cycle A); and
a number of I/O channels which each consist of a pair of pulses.
Channel 3 is transmitting an 'OFF' state so it has a mark-space pulse-pair in the A cycle.

Channel 2 is transmitting an 'ON' state so it has a space-mark pulse-pair in the A cycle.

Channel 4 is transmitting a FAULT state so it has a mark-mark pulse-pair in the A cycle.

All other channels have transmitters off.

Pulse Train B has:

a sync pulse;

8 control channels (1st control channel is a 'space' to indicate cycle B); and a number of I/O channels which each consist of a pair of pulses.

Channel 3 is transmitting an 'OFF' state so it has a space-mark pulse-pair in the B cycle.

Channel 2 is transmitting an 'ON' state so it has a mark-space pulse-pair in the B cycle.

Channel 4 is transmitting a FAULT state so it has a mark-mark pulse-pair in the B cycle.

All other channels have transmitters off.

Accordingly, with reference to FIG. 6A and the table in FIG. 6B, each I/O channel toggles its inbound and outbound pulse-pair state on alternating cycles, allowing for unit detection (and removal detection), detection of stuck transmitters and providing improved noise immunity of false triggers The channel generator 12 emits 8 control channels followed by the configured number of I/O channels regardless of whether or not the channels have been assigned to an I/O device. At the end of the control and channel pulses, the channel generator 12 sends an extended (e.g., extra-wide) pulse that resets all of the counters in the field devices 22 hack to zero before the pulse train is repeated. The long synchronization pulse is used to ensure that all field devices are kept in synchronization, ensuring that transmitters transmit on the correct channel and receivers sample the pulse train at the correct time. Field devices 22 can simply count the pulses or channels until the count matches their assigned address before transmitting or receiving.

With reference to FIGS. 9A and 9B, an 8 ms sync pulse indicates a standard channel bandwidth as defined below. Shorter or longer sync pulses indicate alternate channel bandwidths. Although the channel bandwidth changes as indicated in FIGS. 9A and 9B, the mark-space ratio of the signal remains the same. In accordance with an advantageous aspect of this embodiment of the present invention, a system designer is able to increase the bandwidth for shorter, less noisy and more stable systems, and inversely decrease bandwidth for increased noise immunity and distance for longer, noisier and less stable systems.

With reference to FIG. 9A, standard channel time allocation can be designated as 2400 µs (2.4 ms), for example. FIG. 9A shows reaction times in seconds (e.g., a complete scan cycle) for systems with various numbers of channels and 8 control channels. The column with the standard number of channels (e.g., 256 channels') and the row with the standard channel timing (e.g., 8 ms) show the standard maximum reaction time for a complete single cycle scan of 1.33 seconds.

FIG. 9B illustrates inbound and outbound channel timings such as 'Mark' and 'Space' timings for the standard channel timing of 2400 µs. FIG. 9B provides timings for alternate channel bandwidths as set by the sync pulse timing. If channel timings fall outside of an expected range by more than a small error margin, then a fault has occurred and transmitters are configured to stop transmitting and to resynchronize to the next sync pulse to prevent accidental transmission in the wrong channel slot in the pulse train.

Figures 10A, 10B:
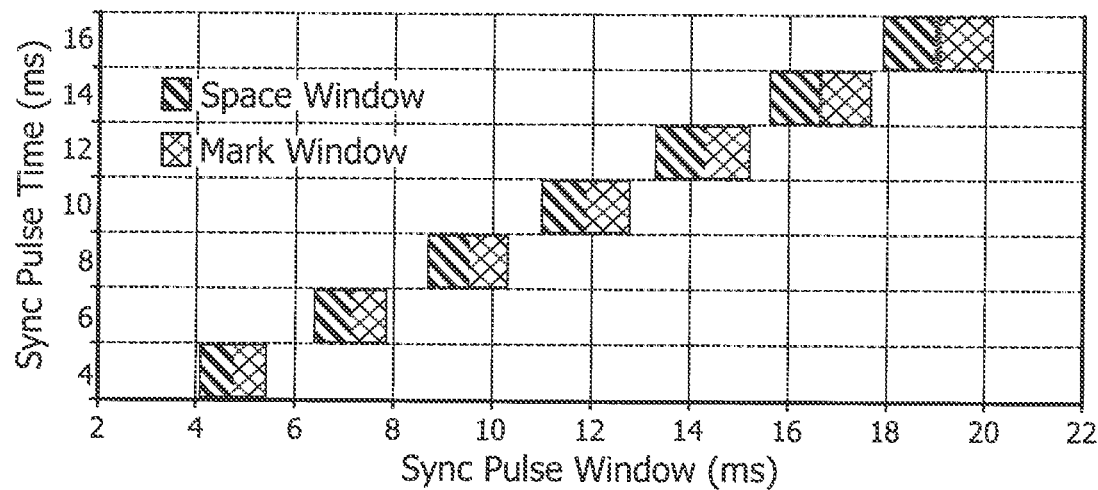
FIGS. 10A and 10B are a diagram and table, respectively, indicating sync pulse detection windows and related timing in accordance with an embodiment of the present invention.

Reference is now made to FIGS. 10A and 10B. Devices 22 on a bus 20 automatically configure to the correct channel bandwidth timings being generated by the channel generator 12 in accordance with an embodiment of the present invention. The devices 22 use the sync pulse to determine the configured bandwidth. As the sync pulse follows the final channel in the scan cycle, the final channel's post mark or space time contributes to the length of the sync pulse's 'high' time. For example, the standard sync pulse of 8 ms and hence 2400 µs channel time can result in a sync pulse that is at the high voltage level for 8 ms+1200 µs (9.2 ms) for a Marked channel or 8 ms+1600 µs (9.6 ms) for a Space channel. FIG. 9B provides the windows for the correct detection of the sync pulse for either mark or space final channel slots with +/−0.1 second error. FIG. 10A graphically illustrates the data in FIG. 10B. If the length of the sync pulse falls into one of the highlighted slots, then the appropriate sync pulse has been detected and hence the bandwidth has been detected.

Additional Embodiments and Implementations

Illustrative embodiments of the present invention have been described with reference to operations at a programmable device such as a channel generator 12 or I/O module or device 22. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, DVDs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements attic various illustrative embodiments that have been described above in numerous other ways, all of which are considered to be within the scope of the invention.

What is claimed is:

1. A method of implementing a bus protocol for interfacing a control unit to plural devices connected to the bus comprising:
   generating a pulse train comprising a plurality of cycles for transmission on the bus, each of the cycles comprising a low voltage level portion for a designated period of time and a high voltage level portion for a second designated period of time and, at least some of the cycles being assigned to respective ones of the plural devices as input/output (I/O) channels;
   wherein the pulse train comprises bus scan cycles that each comprise a selected number of the I/O channels, and a synchronization pulse after the I/O channels that is configured to vary in duration in accordance with a designated change in channel bandwidth.

2. The method of claim 1, wherein the pulse train is a periodic waveform comprising instantaneous transition between the high voltage level and the low voltage level.

3. The method of claim 1, wherein pulse train has configurable frequency.

4. The method of claim 3, wherein the pulse train is an offset square wave with configurable frequency.

5. The method of claim 3, wherein the configurable frequency is dynamically configurable by the control unit during operation of the bus.

6. The method of claim 1, wherein the bus scan cycles comprise dual scan bus cycles having alternating A and B scan cycles where each A scan cycle and each B scan cycle comprises the selected number of I/O channels and its corresponding synchronization pulse.

7. The method of claim 1, wherein the pulse train is an offset square wave with configurable frequency, and comprises a selected number of cycles that are assigned to a corresponding number of the I/O channels and that are generated by the control unit.

8. The method of claim 7, wherein the selected number of I/O channels is configured in the control unit.

9. The method of claim 1, wherein the pulse train is an offset square wave and the high voltage level is between 12 VDC and 48 VDC and the low voltage level is between 2 VDC and 9 VDC.

10. The method of claim 1, wherein each of the plural devices is assigned to a corresponding one of the I/O channels in each of the bus scan cycles and has a counter, and the plural devices each reset their counter in response to the synchronization pulse to ensure that the plural devices transmit and receive on their corresponding I/O channels and that the control unit samples the pulse train at a correct pulse corresponding to a selected one of the plural devices.

11. The method of claim 1, wherein the synchronization pulse is generated al the high voltage level for different respective durations of time corresponding to different channel bandwidths.

12. The method of claim 1, wherein the high voltage level portions in the cycles of the I/O channels in the bus scan cycles can vary in at least one of duration within a cycle, and start of a rising edge of the high voltage level portion within a cycle, depending on whether the cycles are pulse width modulated as a mark or a space, the synchronization pulse is at the high voltage level for a selected duration of time depending on the channel bandwidth, and detection of the synchronization pulse employs a detection window having a range between the duration of the synchronization pulse and a mark and the duration of synchronization pulse and a space for detection of the synchronization pulse regardless of whether the last one of the I/O channel has a mark or a space.

13. The method of claim 1, wherein an I/O channel comprises one of the cycles.

14. The method of claim 1, wherein an I/O channel comprises a designated plural number of the cycles.

* * * * *